Sept. 26, 1933.  E. W. McKINLEY  1,928,497
THERMOSTAT CONTROL DEVICE
Filed March 1, 1932
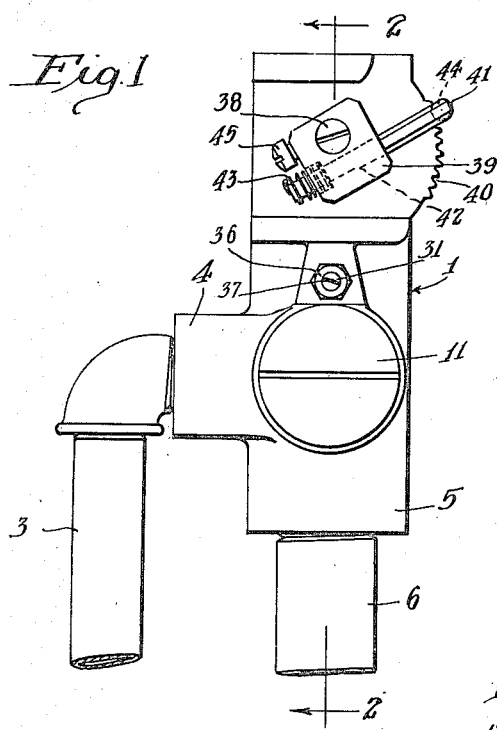
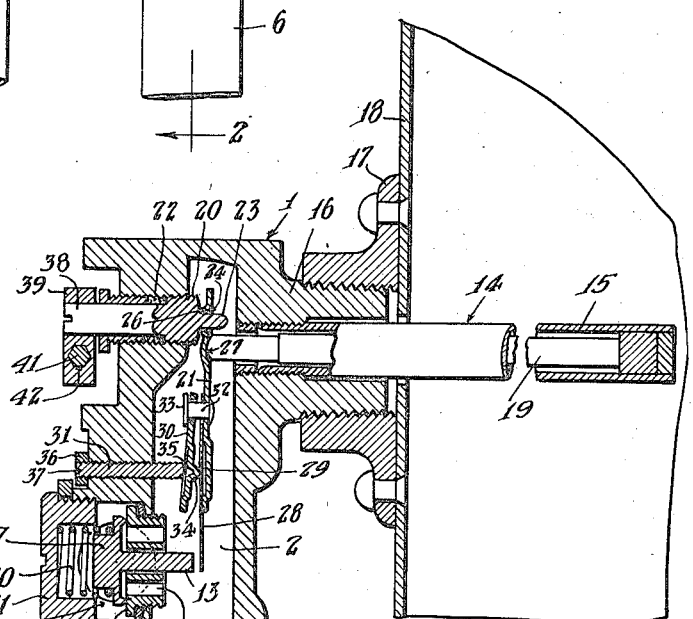
Inventor
Edwin W. McKinley
By Lyon & Lyon
Attorneys Patented Sept. 26, 1933

1,928,497

UNITED STATES PATENT OFFICE 1,928,497

THERMOSTAT CONTROL DEVICE

Edwin Whitfield McKinley, Compton, Calif., assignor, by mesne assignments, to Southern Water Heater Corporation, Compton, Calif., a corporation of California Application March 1, 1932. Serial No. 596,068

11 Claims. (Cl. 236—48)

This invention relates to a thermostatic control for valves, or the like, and while features of the invention may be employed for different specific purposes, in the present specification the invention is described as applied to a gas valve supplying gas to a water heater. Such thermostatic control devices are employed for various purposes such as controlling safety shut-off valves in case a pilot flame becomes extinguished, and for shutting off a gas valve if the temperature in a water heater becomes dangerously high.

In the present instance, the invention is described as applied to a water heater to open the gas supply to the burner automatically in case the temperature of the water being heated falls below a predetermined temperature. A type of thermostat control device has come into vogue involving the "snap disk" principle, and such heaters include in their construction a concavo-convex disk, which, if thrust upon at its center or its convex side, will snap over to an opposite position. The push rod of the thermostat is mounted in such a way that its movement effects a pressure upon the snap disk, and causes such snap-over movement to an opposite position. This snap-over movement is utilized to effect the opening or closing of a valve. The disk type of thermostatic control necessitates the use of a considerable number of parts.

The general object of this invention is to produce a thermostatic control device of simple construction involving a few very simple parts, and capable of nice regulation in regard to the temperature at which the snap-over action of the control device will take place.

A further object of the invention is to produce a control device having this desirable "snap-over" action without employing a snap-over disk in the construction; also to provide a construction of this type capable of developing considerable movement in the controlled part, for example, the valve closure.

A further object of the invention is to provide a construction which can not damage the snap-over element in case the push bar of the thermostat continues to move after the snap-over action has taken place. In this connection, it should be understood that in the concavo-convex spring of this snap-over type, if the spring is bent forcibly in a direction to flex it unduly, the spring may be permanently injured; this interferes with the reliable operation of the device.

A still further object of the invention is to provide a thermostat control device of this kind capable of being regulated so as to give the thermostat a great range of action, that is, so as to enable considerable range in setting the temperature at which the snap-over action of the device will take place.

Further objects of the invention will appear hereinafter.

The invention consists of novel parts and combinations of parts to be described hereinafter, all of which contribute to produce an efficient thermostat control device.

A preferred embodiment of the invention is described in the following specification, while the broad scope of the invention is pointed out in the appended claims.

In the drawing—

Figure 1 is a front elevation of a thermostat-controlled valve, embodying my invention. In this view, the pipe connections are represented broken away.

Figure 2 is a vertical section taken on the line 2—2 of Figure 1, and particularly illustrating the details of the device together with the thermostat, and its connections to the wall of a heater, the wall of the heater and other parts being broken away, and shown in section.

Figure 3 is a front elevation of the snap-over assembly removed from the casing of the valve, certain parts being broken away, or shown in section.

Referring more particularly to the parts, 1 represents a casing for a controller element. In the present instance this is a valve casing having a valve chamber 2 within the same to which gas may be supplied by a pipe connection 3, which is connected to an inlet 4 on the side of the casing. The casing is provided with an outlet 5 to which a delivery pipe 6 is connected, leading to a burner (not illustrated).

The inlet 4 and the outlet 5 may be in communication when the controller element, for example, a valve closure 7 is raised off its seat 8; in other words, the pipe 3 admits gas to an inlet chamber 9 at the side of the valve so that the pressure of the gas will tend to hold the valve closure on its seat. This closing movement of the valve is also assisted by the presence of a light coil spring 10, which may be held in a removable screw cap 11 back of the head of the valve closure. When the valve closure 7 is off its seat, the port, or passage, 12, through the valve is open. The valve closure, in the present instance, includes a valve stem 13 that guides the valve closure in its opening and closing movements, and this stem projects into the chamber 2 on the interior of the casing.

In adapting my invention to control a valve of this type and to open the valve automatically if the temperature drops below a predetermined point, I employ a thermostat 14 of the common tube type involving the use of a heat sensitive tube 15, such as copper, the outer end of which is rigidly secured in the threaded neck 16 of the casing, which is attached to a socket 17 riveted to the wall 18 of a boiler. The thermostat 14 projects into the water, or other liquid, in the boiler being heated. The inner end of the thermostat tube 15 carries a push rod 19 of a suitable composition that is relatively non-sensitive to heat in regard to its expansion and contraction, the outer end of this push rod extending into the valve chamber 2.

Within the valve chamber, I provide a rigid traveling support for the snapping element. This support is preferably in the form of a small lever 21, having a fulcrum 20, preferably in the form of a screw of relatively large diameter mounted in a threaded opening 22 in the outer wall of the casing. In order to mount the lever 21 in place, I prefer to provide the end of this fulcrum screw 20 with a pintle 23 that is received in a socket, or opening, 24, which is punched through the lever.

At this opening, the material of the lever is preferably offset toward the fulcrum screw, so as to form a transverse rib 25 (see Figure 3), which rests against the shoulder 26 formed at the root of the pintle 23. The lever 21 receives the thrust of the end of the push rod which is located on the side of the lever opposite to the fulcrum screw, and, if desired at this point, a slight depression, or socket, 27 may be formed in the lever to assist in holding the lever in position. The lever, therefore, extends transversely to the push rod 19, and projects toward the valve stem 13.

Associated with the actuating lever 21, and preferably attached to it, I provide a striker in the form of a snap bar 28 which is preferably in the form of an elongated concavo-convex leaf spring of suitable resilient material, such as spring steel. The end of this spring 28 projects beyond the end of the lever and lies adjacent to the end of the stem 13; in other words, I mount this spring 28, so that it can control the part which I desire to control at a predetermined temperature.

The face of the lever adjacent to the snap-over spring 28 is preferably formed with a slight depression 29, and opposite this point, I mount bearer means which preferably consists of a bearer plate 30 and adjusting means such as a screw 31 mounted in the casing at this point. Any suitable means may be employed for mounting the spring and the bearer plate on the lever, but I prefer to accomplish this by means of two pins, or rivets, 32 to which the spring and the plate 30 are attached loosely, but retained on the pins by their heads 33. The bearer plate is preferably provided with an abutment 34 in the form of an integral offset from the plate that projects towards the depression 29, and before the snap action has taken place that controls the valve, this abutment rests against the convex side of the snap bar while the concave side of the snap bar is, of course, bridging the recess 29.

The tip of the adjusting screw 31 preferably is received in a recess 35 formed on the interior of the abutment 34, and on the outer side of the bearer plate; that is, on the side of the bearer plate remote from the lever 21. The bearer screw 31 is preferably provided with a lock-nut 36 which enables it to be secured firmly in any position to which it may be adjusted by means of a screw-driver slot 37 in its outer end.

In order to enable the device to be adjusted so as to regulate and increase the range of the predetermined temperature at which the snap-over action will take place, I prefer to provide the shank 38 of the fulcrum screw 20 with a head 39 which carries a latch device capable of latching the screw 20 in any adjusted position. The pitch of the thread of this screw should be relatively high, so that a very slight rotation of the screw causes considerable inward or outward movement of the end of the lever 21 that is supported on the pintle 23. For this purpose, I prefer to provide the valve casing near the head 39 with a toothed quadrant 40, and I provide the head 39 with a handle 41 in the form of a stem that is mounted to slide in a guide 42 in the head 39. The inner end of this handle 41 projects beyond the head 39 and carries a small coil spring 43 that tends to pull the stem into the head. The stem is provided at its end with a laterally projecting finger 44 which can engage in the notches between the teeth of the toothed segment. By pulling this finger 44 out of a notch, the screw 20 can readily be rotated in either direction. The head 39 is preferably not integral with the shank 38 of this fulcrum screw, but is attached to it by means of a set screw 45. This set screw, of course, attaches the head rigidly, but enables the head to be fixed in any desired position on the shank 38 so as to insure that the latch finger 44 and the toothed segment 40 will cooperate properly with the thermostat.

In the operation of the device, when the temperature in the boiler arrives at a predetermined point, the thrust of the push rod 19 will develop a considerable pressure of abutment 34 against the convex side of the spring 28, and this will cause the spring to snap-over to an opposite position; in other words, this pressed point of the spring snaps over into the recess 29, and this will cause the projecting end of the spring 28 to strike the end of the stem 13 and hold the valve open. This will admit gas to the gas burner heating a boiler. When the temperature of the water in the boiler rises sufficiently, the push rod 19 will commence to draw away from the lever 21, thereby relieving the pressure upon it. When this pressure becomes sufficiently relieved, the pressure of the stem 13 against the spring 28 will cause it to snap back to the position in which it is shown in Figure 2.

If this thermostat device is subjected to a very low temperature, no injury will be done to the spring 28 by reason of the fact that the flexing of this spring by the abutment 34 will be limited by the bottom of the depression 29; in other words, any undue contraction of the thermostat element 15 can not injure the spring.

It is understood that the embodiment of the invention described herein is only one of the many embodiments this invention may take, and I do not wish to be limited in the practice of my invention, nor in my claims, to the particular embodiment set forth.

One of the advantages of the use of my invention is that a considerable amount of movement occurs at the end of the snap spring 28. This gives a considerable opening movement to the valve without necessitating the use of other parts to multiply the amount of movement. This is, of course, due to the fact that this end of the spring lies a considerable distance from the adjacent edge of the depression 29 of the lever.

What I claim is:

1. In a thermostat controlled valve, the combination of a casing, a valve including a seat and a valve closure, a thermostat member, a push rod controlled thereby, a fulcrum, a lever resting against the fulcrum, extending toward the valve transversely to the push rod and engaged by the push rod, a resilient concavo-convex snap-bar mounted on the lever and having a part lying adjacent to the valve closure, and bearer means including a part mounted on the casing, for engaging the convex side of the snap-bar, said parts cooperating at a predetermined temperature to enable the thrust of the push rod to snap over the snap-bar, and thereby impart movement to the valve closure.

2. In a thermostat controlled valve, the combination of a casing, a valve including a seat and a valve closure, a thermostat member, a push rod controlled thereby, a fulcrum having means for adjusting the same, a lever resting against the fulcrum, extending toward the valve, transversely to the push rod and engaged by the push rod, a resilient concavo-convex snap-bar mounted on the lever and having a part lying adjacent to the valve closure, and bearer means including a part mounted on the casing, for engaging the convex side of the snap-bar, said parts cooperating at a predetermined temperature to enable the thrust of the push rod to snap over the snap-bar, and thereby impart movement to the valve closure.

3. In a thermostat controlled valve, the combination of a casing, a valve including a seat and a valve closure, a thermostat member, a push rod controlled thereby, a fulcrum, a lever resting against the fulcrum, extending toward the valve, transversely to the push rod and engaged by the push rod, a resilient concavo-convex snap-bar mounted on the lever and having a part lying adjacent to the valve closure, and bearer means including an adjustable part mounted on the casing, for engaging the convex side of the snap-bar said parts cooperating at a predetermined temperature to enable the thrust of the push rod to snap over the snap-bar, and thereby impart movement to the valve closure.

4. In a thermostat controlled valve, the combination of a casing, a valve including a seat and a valve closure, a thermostat member, a push rod controlled thereby, a fulcrum supported on the casing, a lever resting against the fulcrum, extending toward the valve, transversely to the push rod and engaged by the push rod adjacent to the fulcrum, a resilient concavo-convex snap-bar mounted on the lever and having its end lying adjacent to the valve closure, and bearer means including a plate supported on the lever and having an abutment engaging the convex side of the snap-bar before actuation of the snap-bar, said bearer means including adjustable means for pressing the bearer plate against the snap-bar, said parts cooperating at a predetermined temperature to enable the thrust of the push rod to snap over the snap-bar and thereby effect a movement of the valve closure.

5. In a thermostat-controlled valve, the combination of a casing, a valve including a seat and a valve closure, a thermostat member, a push rod controlled thereby, a fulcrum in the form of a hand-controlled screw mounted in the casing, a lever resting against the fulcrum extending toward the valve, transversely to the push rod, and engaged by the push rod, a resilient concavo-convex snap bar associated with the lever and having a part, the movement whereof controls the valve closure, and bearer means including a part mounted on the casing for engaging the side of the snap-bar when it has its convex side toward the said parts cooperating at a predetermined temperature to enable the thrust of the push rod to snap over the snap-bar and thereby impart movement to the valve closure.

6. In a thermostat-controlled valve, the combination of a casing, a valve including a seat and a valve closure, a thermostat member, a push rod controlled thereby, a fulcrum in the form of a hand-controlled screw mounted in the casing, and having a pintle at its inner end, a lever having a socket receiving the said pintle and resting against the end of the fulcrum, said lever extending toward the valve, transversely to the push rod and engaged by the push rod, a resilient concavo-convex snap bar associated with the lever and having a part, the movement whereof controls the valve closure, and bearer means including a part mounted on the casing for engaging the side of the snap-bar, said parts cooperating at a predetermined temperature to enable the thrust of the push-rod to snap over the snap-bar and thereby impart movement to the valve closure.

7. In a thermostat-controlled valve, the combination of a casing, a valve including a seat and a valve closure, a thermostat member, a push rod controlled thereby, a fulcrum in the form of a hand-controlled screw mounted in the casing, a lever resting against the fulcrum extending toward the valve, transversely to the push-rod, and engaged by the push-rod, a resilient concavo-convex snap-bar associated with the lever and having a part, the movement whereof controls the valve closure, said snap-bar lying against the side face of the lever, bearer means in the form of a plate attached to the lever having a rib on its face for engaging the convex face of the snap-bar to exert thrust upon the same toward the lever, and a screw mounted in the casing for holding the bearer plate against the snap bar, said lever having a depression opposite the rib to facilitate the snapping over of the snap-bar to an opposite position, said parts cooperating at a predetermined temperature to enable the thrust of the push-rod to snap over the snap-bar and thereby impart movements to the valve closure.

8. In a thermostat-controlled valve, the combination of a casing, a valve including a seat and a valve closure, a thermostat member, a push-rod controlled thereby, a fulcrum in the form of an adjustable screw mounted in the casing and having a pintle at its inner end within the casing, a lever having a socket receiving the pintle and having a recess for receiving the end of the push-rod, said lever extending toward the valve closure, a concavo-convex leaf spring attached to the lever and projecting beyond the end of the same, and bearer means for engaging the side of the leaf spring opposite the lever, said parts cooperating at a predetermined temperature to enable the thrust of the push-rod to snap over the leaf spring and thereby impart movement to the valve closure.

9. In a thermostat-controlled valve, a lever to cooperate with a push-rod and a fulcrum, having means at one end for mounting the lever on the fulcrum, a concavo-convex snap-acting leaf spring secured to the lever and projecting beyond the other end of the lever, and a bearer plate carried on the lever and having means for engaging the side of the leaf spring remote from the lever, said lever having a depression in the face thereof to cooperate with the bearer plate to facilitate snapping the leaf spring.

10. In a thermostat-controlled valve, the combination of a lever having means toward one end for mounting the same on a fulcrum, said lever having a depression in its face toward its other end, a snap-bar in the form of a leaf spring attached to the lever, extending across the said depression and projecting beyond the end of the lever, and a bearer plate mounted on the lever on the side of the leaf spring remote from the lever and having means for engaging the spring opposite the said depression.

11. In a thermostat-controlled valve having a temperature controlled push-rod, a lever to cooperate with the push rod and a fulcrum, said lever having means at one end for mounting the lever in contact with the fulcrum, a concavo-convex snap-acting leaf spring secured to the lever and projecting beyond the other end of the lever, said lever having a depression in its face adjacent the side of the spring and located opposite the fulcrum, and cooperating with the fulcrum in the snapping action of the leaf spring.

EDWIN WHITFIELD McKINLEY.